United States Patent
Luo et al.

(10) Patent No.: US 9,537,377 B2
(45) Date of Patent: Jan. 3, 2017

(54) MOTOR WITH LOW ELECTROMAGETIC INTERFERENCE

(71) Applicant: Johnson Electric S.A., Murten (CH)

(72) Inventors: Qing Bin Luo, Shenzhen (CN); Zhao Sen Meng, Shenzhen (CN); Wen Ming Wu, Shenzhen (CN); Wing Cheung Lam, Hong Kong (CN); Qiang Xu, Shenzhen (CN); Da Xuan Zhan, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 608 days.

(21) Appl. No.: 13/872,926

(22) Filed: Apr. 29, 2013

(65) Prior Publication Data

US 2013/0307360 A1 Nov. 21, 2013

(30) Foreign Application Priority Data

Apr. 28, 2012 (CN) .......................... 2012 1 0133102

(51) Int. Cl.
*H02K 11/02* (2016.01)
*H02K 7/116* (2006.01)

(52) U.S. Cl.
CPC ............ *H02K 11/026* (2013.01); *H02K 11/40* (2016.01); *H02K 7/1166* (2013.01)

(58) Field of Classification Search
CPC .................. H02K 11/00–11/048; H01F 17/04
USPC ..................................................... 310/71, 72
See application file for complete search history.

(56) References Cited

U.S. PATENT DOCUMENTS

| 4,355,253 | A | * | 10/1982 | Vollbrecht | H01R 39/40 310/239 |
| 4,673,837 | A | * | 6/1987 | Gingerich | H02K 5/148 29/597 |
| 6,550,599 | B2 | * | 4/2003 | Kudou | H02K 7/102 192/223.2 |
| 2010/0039197 | A1 | * | 2/2010 | Cheng | H01F 3/08 336/83 |
| 2010/0117470 | A1 | * | 5/2010 | Stubner | B60S 1/166 310/72 |
| 2012/0013226 | A1 | * | 1/2012 | Stubner | H02K 11/026 310/68 R |

FOREIGN PATENT DOCUMENTS

| CN | 201387803 Y | 1/2010 |
| CN | 201584257 U | 9/2010 |
| DE | WO 2005046031 A1 * | 5/2005 | ........... H02K 11/026 |

OTHER PUBLICATIONS

Machine Translation, Frank, WO 2005046031 A1, May 19, 2005.*

* cited by examiner

*Primary Examiner* — Thomas Truong
(74) *Attorney, Agent, or Firm* — Muncy, Geissler, Olds & Lowe, P.C.

(57) ABSTRACT

A motor assembly for a window lift mechanism has a motor and a gearbox. The motor includes a stator having a metal housing, and a rotor with a commutator, rotatably received in the housing. An end cap assembly is connected to the housing. The end cap assembly includes a plurality of brushes making sliding contact with the commutator, a plurality of connecting pieces for connecting an external power source, inductors connected between the brushes and the connecting pieces, and shielding layers cladding the inductors and electrically connected to the housing.

20 Claims, 6 Drawing Sheets

MOTOR WITH LOW ELECTROMAGETIC INTERFERENCE

CROSS REFERENCE TO RELATED APPLICATIONS

This non-provisional patent application claims priority under 35 U.S.C. §119(a) from Patent Application No. 201210133102.1 filed in The People's Republic of China on Apr. 28, 2012.

FIELD OF THE INVENTION

The present invention relates to electric motors and in particular, to a motor which emits low levels of electromagnetic interference (EMI).

BACKGROUND OF THE INVENTION

An electric motor having a commutator and brushes usually includes a filter circuit connected between the brushes and the external power source, to reduce electrical noise or EMI. The filter circuit usually has an inductor. During operation, the commutator rotates at a high speed with respect to the brushes and the current in windings connected to the commutator changes rapidly, producing EMI signals. These signals couple with the inductor. When the EMI signals are of high frequency, the inductor will perform as an antenna to emit high frequency interference signals, leading to failure in the EMI test of the motor.

Accordingly, there is a desire for a new motor having a filter circuit including an inductor and which emits low levels of EMI signals.

SUMMARY OF THE INVENTION

Accordingly, in one aspect thereof, the present invention provides a motor comprising: a stator having a metal housing; a rotor rotatably received in the housing and having a commutator; and an end cap assembly connected to the housing, the end cap assembly comprising: a plurality of brushes making sliding contact with the commutator; a plurality of connecting pieces for connecting an external power source; an inductor electrically connected between one of the brushes and a selected one of the connecting pieces; and a shielding layer cladding the inductor and electrically connected to the housing.

Preferably, the shielding layer is made of metal.

Preferably, the shielding layer is a thin tin sheet.

Preferably, the inductor has a substantially cylindrical main body with two leads extending from respective axial ends of the main body, and the shielding layer clads the main body of the inductor.

Preferably, the shielding layer comprises a ground end electrically connected to the housing.

Preferably, the end cap assembly has an intermediate piece connected to the housing, and the ground end is electrically connected to the housing via the intermediate piece.

Preferably, a first of the leads is connected to one of the brushes and the second lead is connected to the connecting piece.

Preferably, a slot is formed in the connecting piece and the second lead of the inductor is pressed into the slot.

Preferably, the stator comprises a plurality of magnets housed in the housing, and the rotor comprises a rotor core surrounded by the magnets and a plurality of coils wound around the rotor core.

The present invention also provides window lift motor assembly, incorporating the motor defined above, the motor having a worm shaft in mesh with a worm gear.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
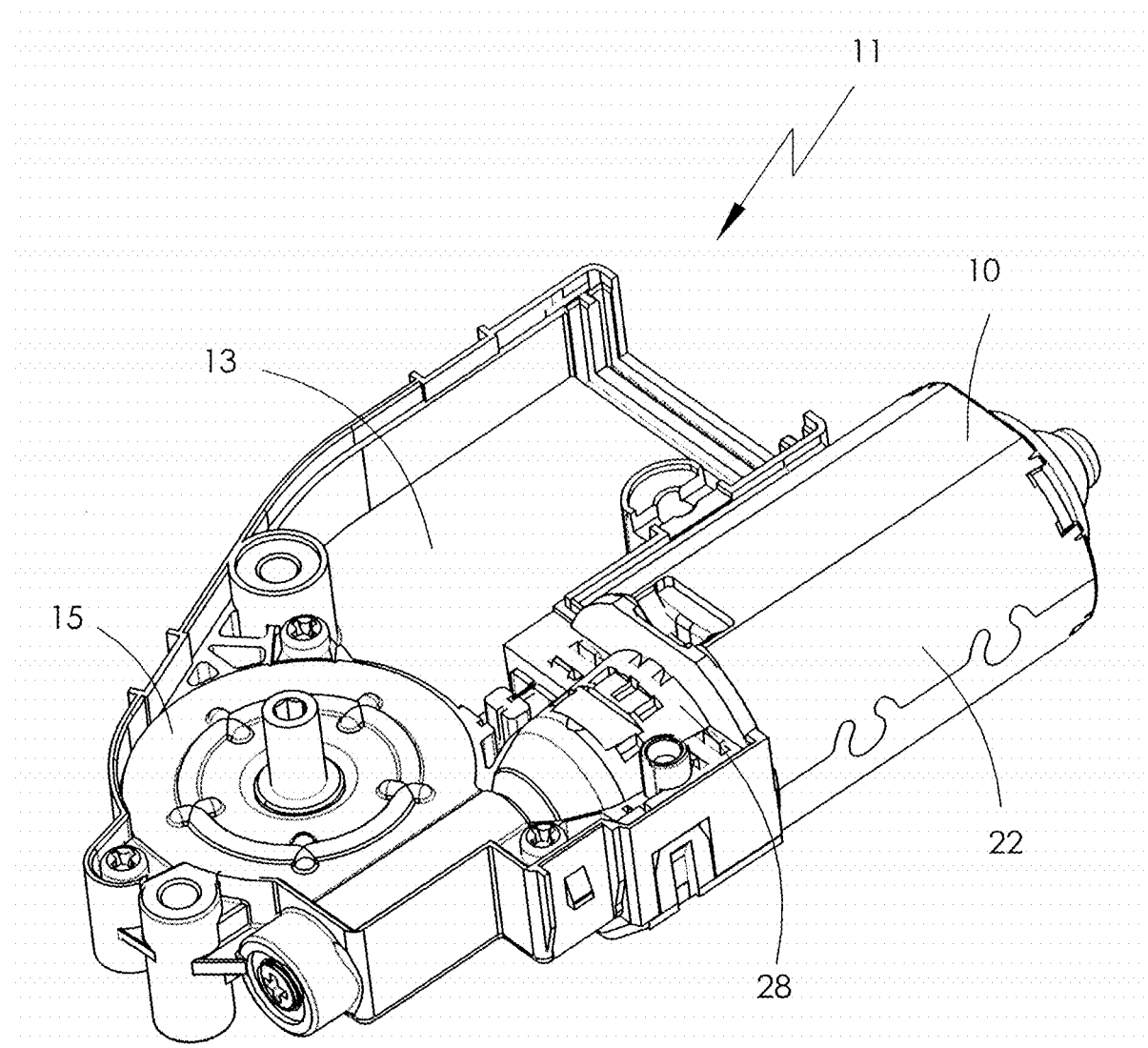
FIG. 1 shows a window lift motor assembly having a motor in accordance with an embodiment of the present invention.
Figure 2:
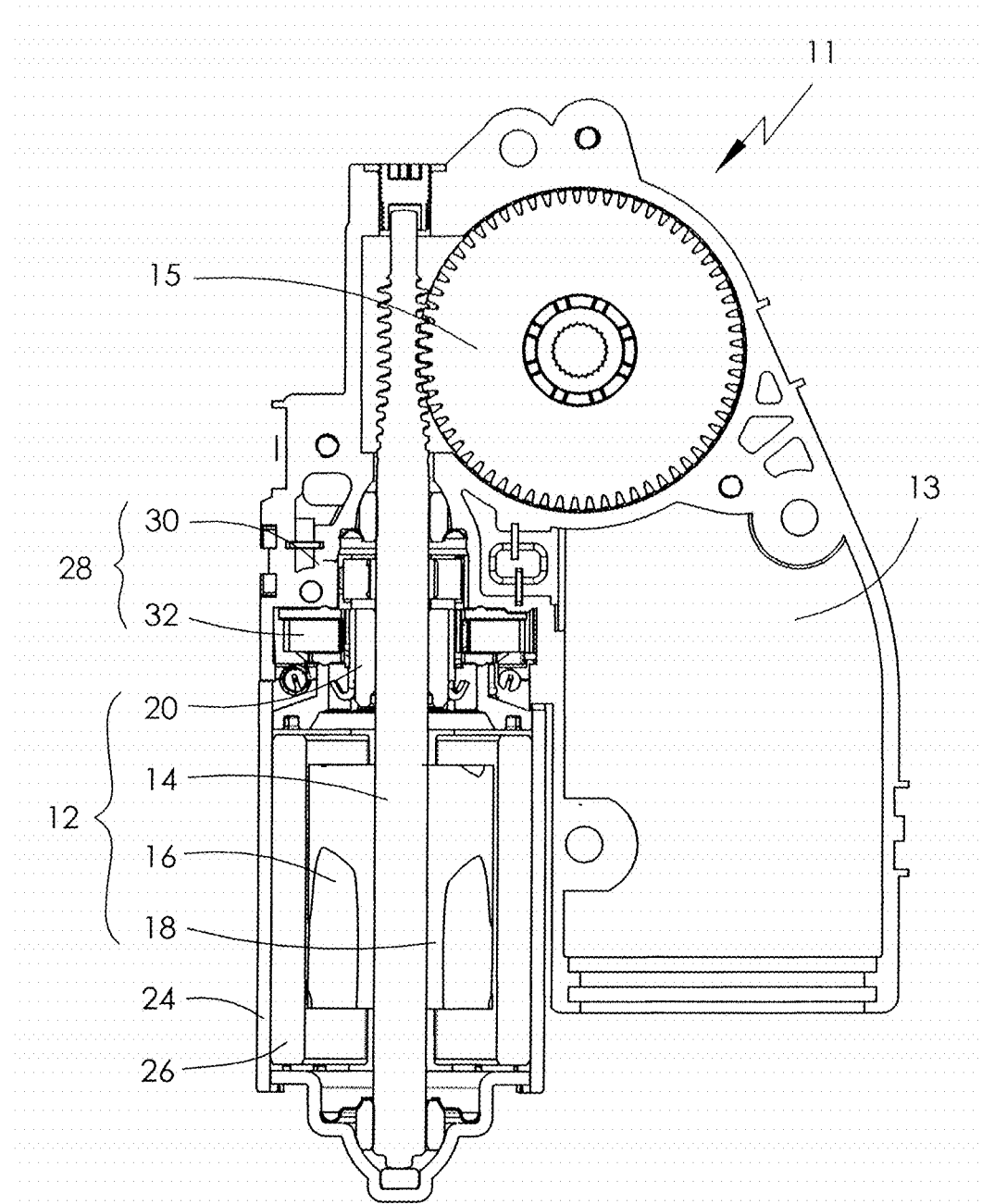
FIG. 2 is an cutaway view of the window lift motor assembly of FIG. 1.
Figure 3:
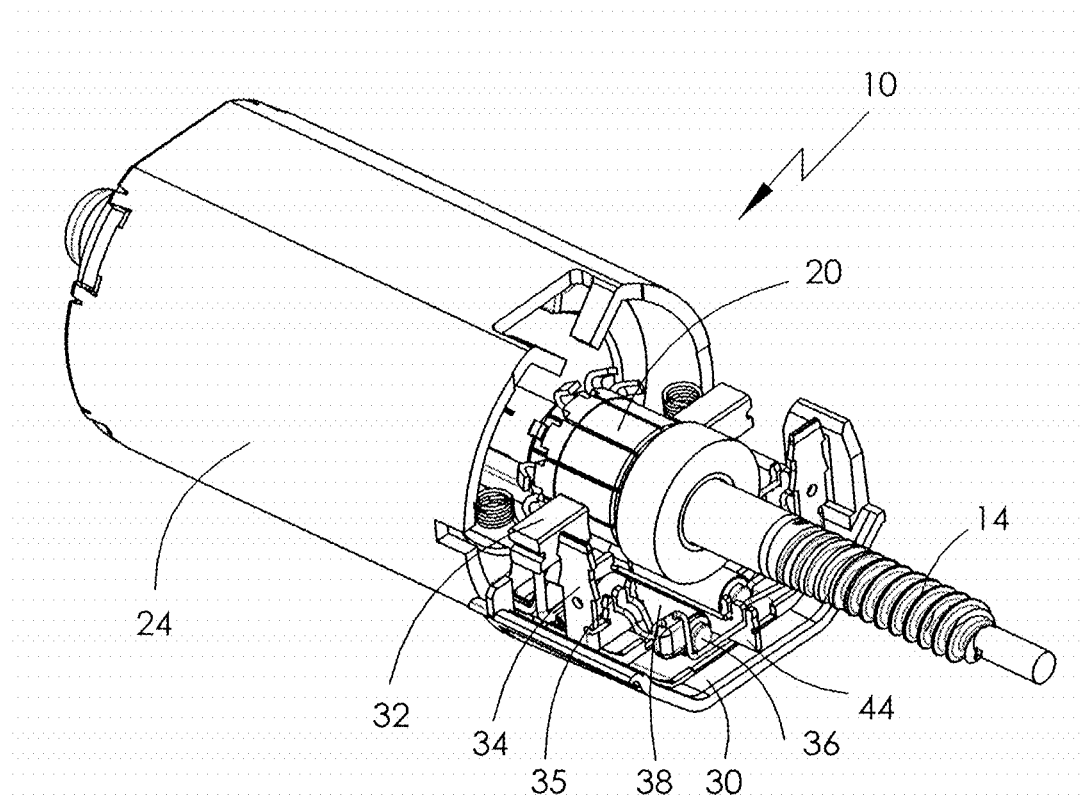
FIG. 3 is a partial view of the motor of FIG. 1, showing a shielding layer cladding an inductor.

FIGS. 1 to 3 show a motor 10 in accordance with an embodiment of the present invention used in a window lift motor assembly 11. The assembly 11 includes a casing 13 to which the motor 10 is connected and a worm gear 15 received in the casing 13. The worm gear 15 engages with and is driven by the motor 10 for outputting a torque. The window lift motor assembly is shown with a cover of the casing removed to show the internal parts The motor 10 includes a rotor 12 and a stator 22 housing the rotor 12. The rotor 12 includes a shaft 14, a rotor core 16 fixed to the shaft 14, a number of coils 18 wound around the rotor core 16, and a commutator 20 fixed to the shaft 14. The shaft 14 engages with the worm gear 15 via a worm formed on the shaft. The stator 22 includes a substantially cup-shaped metal housing 24 having an opening (not labeled), a number of permanent magnets 26 attached to the inner wall of the housing 24 and surrounding the rotor core 16 and the coils 18, and an end cap assembly 28 closing the opening of the housing 24.

The end cap assembly 28 includes an insulate end cap 30 (partially shown in FIG. 3), a number of brushes 32 fixed to the end cap 30 and making sliding contact with the commutator 20, a number of conductive connecting pieces 34 fixed to and extending outside the end cap 30 for connecting to an external power source, a number of inductors 36 connected between respective connecting piece 34 and brush 32, and a number of shielding layers 38. The end cap is preferably formed as an integral part of the casing 13.

Figure 4:
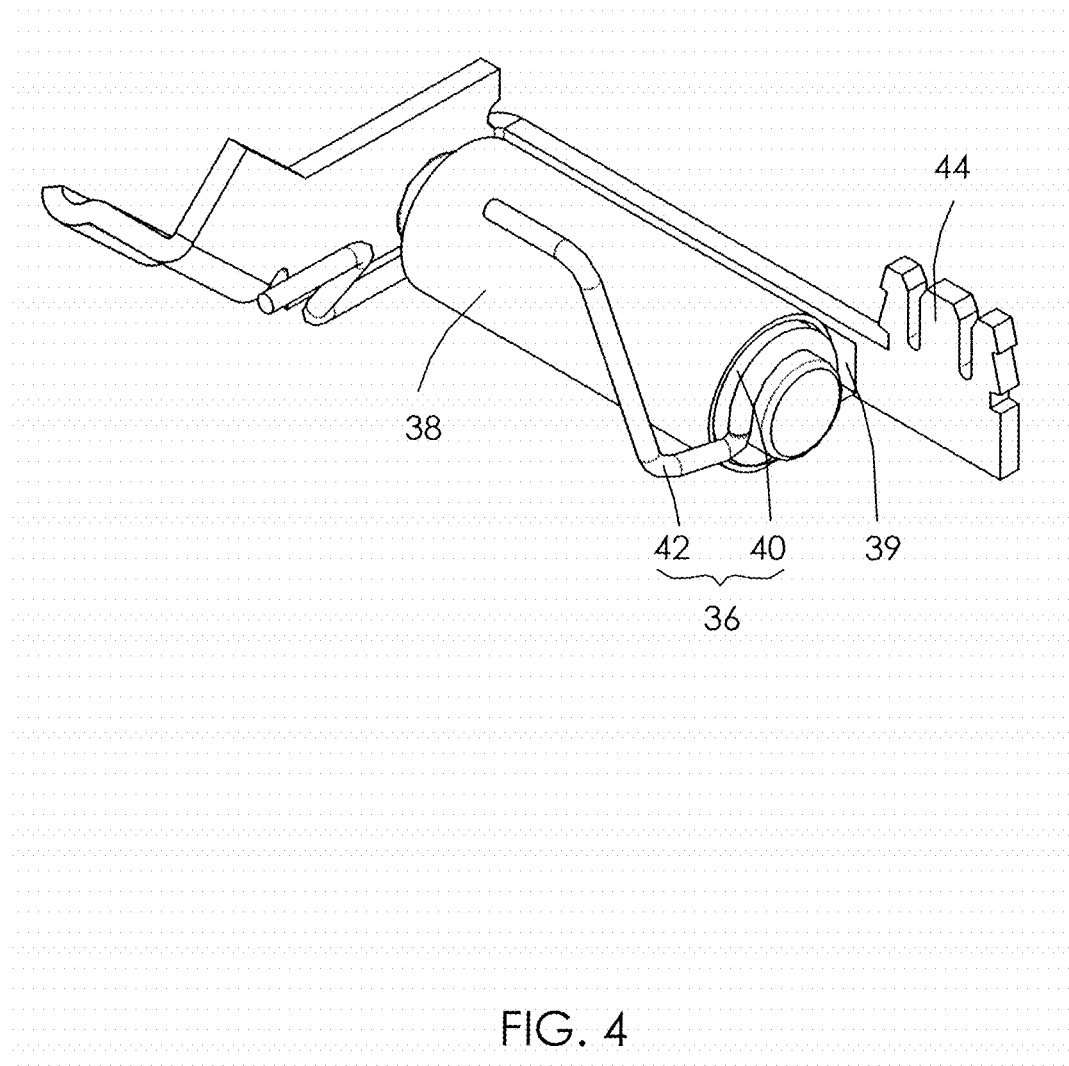
FIG. 4 shows the inductor of FIG. 3.

Referring to FIG. 4, each inductor 36 includes a substantially cylindrical main body 40 and two leads 42 extending from respective axial ends of the main body 40. The two leads 42 are electrically connected to the connecting piece 34 and the brush 32 respectively. The shielding layer 38 clads the main body 40 of the inductor 36 and includes a ground end 39 extending axially at its free end. The ground end 39 is electrically connected to the housing 24, via a conductive intermediate piece 44 fixed to the housing 24 in the present embodiment. The ground end 39 can be connected to the intermediate piece by welding or cladding part of the intermediate piece, for example. The shielding layer 38 can be made of metal such as copper, aluminum, or tin. In the present embodiment, the shielding layer 38 is thin tin sheet, which has low cost and is easily wound around the main body 40 of the inductor 36.

Figure 5A:
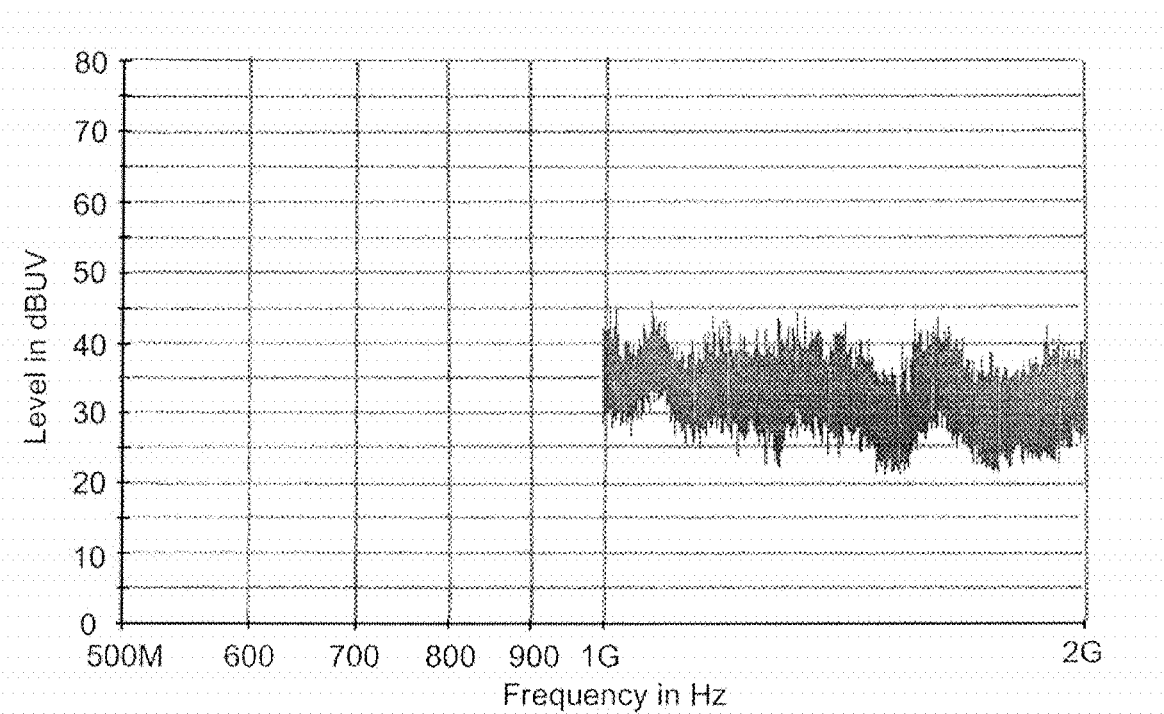
FIG. 5A shows an EMI test result of the vertical component of the EMI signals for frequencies between 1 GHz and 2 GHz generated by the motor of FIG. 3.
Figure 5B:
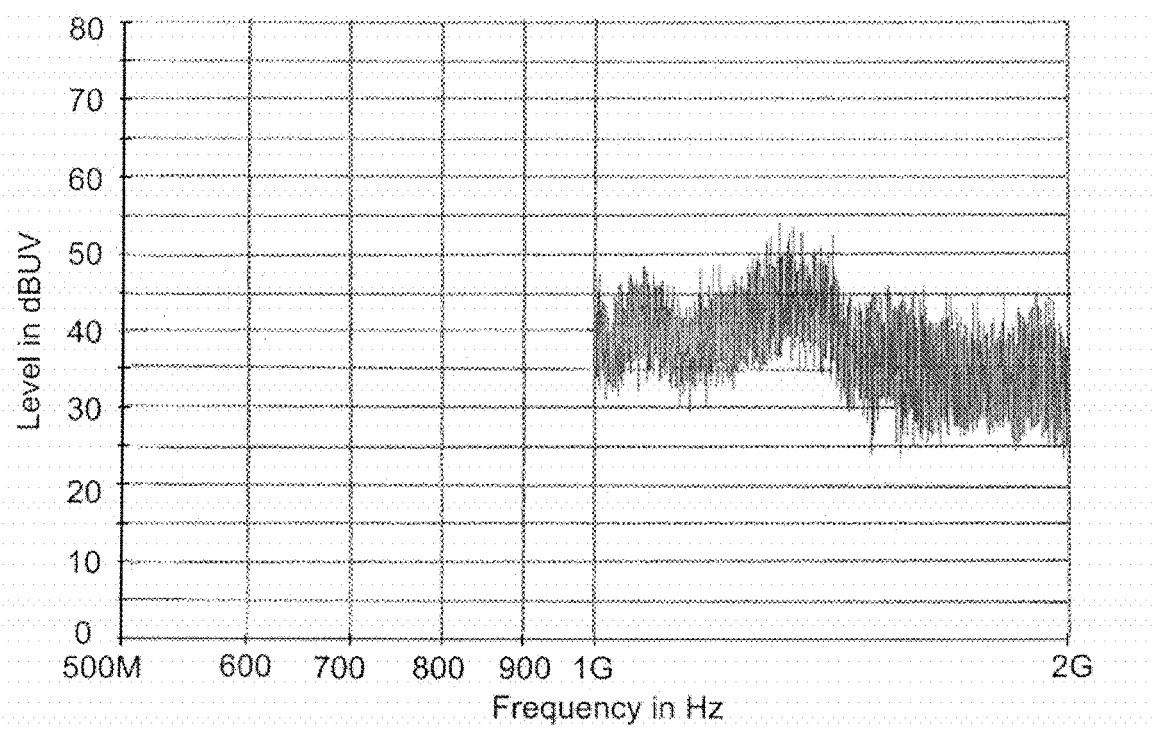
FIG. 5B is similar to FIG. 5A except that the shielding layer of the tested motor has been removed.
Figure 6A:
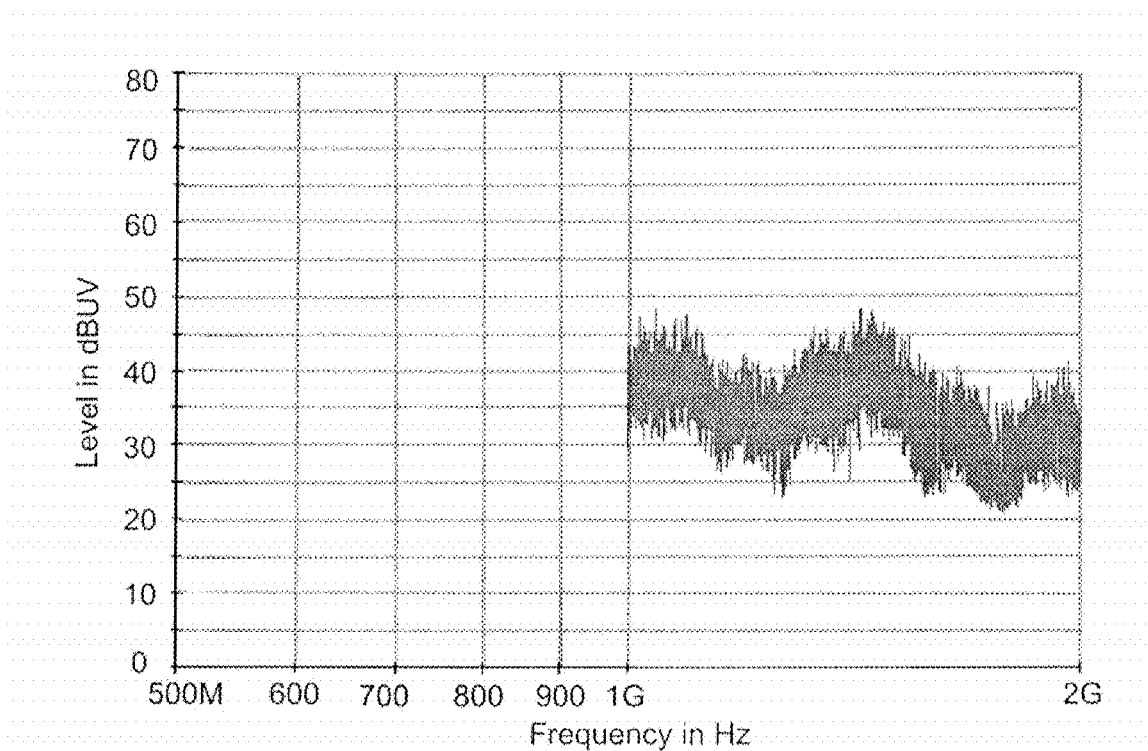
FIG. 6A shows an EMI test result of the horizontal component of the EMI signals for frequencies between 1 GHz and 2 GHz generated by the motor of FIG. 3.
Figure 6B:
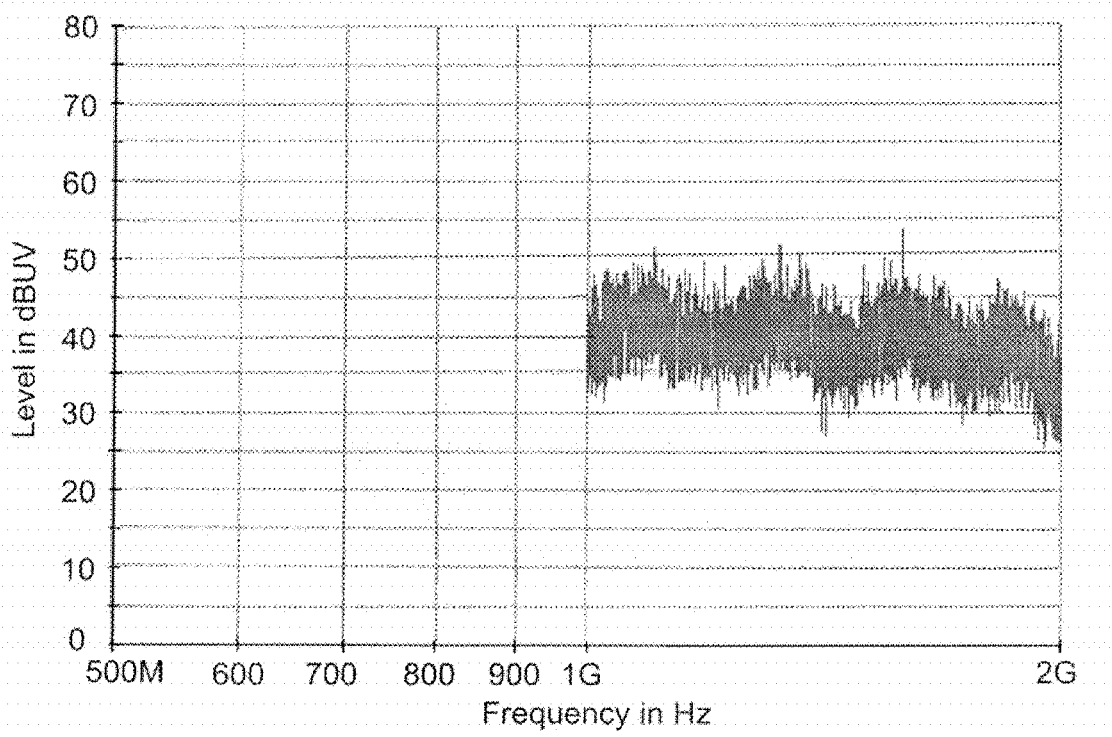
FIG. 6B is similar to FIG. 6A except that the shielding layer of the tested motor has been removed.

In this way, during operation, most of the EMI signals radiated by the inductor 36 will be absorbed by the housing 24 of the motor 10 via the shielding layer 38. As can be seen from FIGS. 5A and 5B, the vertical component of the EMI signal from the motor 10 with frequencies between 1 GHz and 2 GHz has been reduced by about 6 dB. Referring to FIGS. 6A and 6B, the horizontal component of the EMI signals with frequencies between 1 GHz and 20 Hz generated by the motor 10 has been reduced by about 7 dB in the present embodiment. As such, the EMI signals generated by the whole motor 10 are lower.

Preferably, each connecting piece 34 defines a slot 35 therein. One of the leads 42 of the inductor 36 is pressed into the slot 35 for connecting the inductor 36 to the connecting piece 34.

It should be understood that in other embodiments, when the inductor 36 is arranged next to the housing 24 of the motor 10, the ground end 39 can be connected to the housing 24 directly. In this case, the intermediate piece 44 can be eliminated.

It should be understood that the end cap can be integrally formed with the casing 13 of the window lift motor assembly 11 as shown in the preferred embodiment. Alternatively, the end cap may be separately formed allowing the motor to be fully assembled before being connected to the casing.

In the description and claims of the present application, each of the verbs "comprise", "include", "contain" and "have", and variations thereof, are Used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A motor comprising:
a stator having a metal housing;
a rotor rotatably received in the housing and having a commutator;
an end cap assembly connected to the housing and comprising a plurality of brushes making sliding contact with the commutator, and at least one inductor;
wherein the end cap further comprises an insulate end cap and at least one shielding layer, the at least one shielding layer is attached on an inner wall of the insulate end cap to clad the at least one inductor and electrically connected to the housing; and the at least one shielding layer transfers EMI signals radiated by the at least one inductor to the housing.

2. The motor of claim 1, wherein the shielding layer is made of metal and does not protrude out of the insulate end cap.

3. The motor of claim 1, wherein the shielding layer is a thin tin sheet.

4. The motor of claim 1, wherein the inductor comprises a substantially cylindrical main body with two leads extending from respective axial ends of the main body, and the shielding layer is substantially hollow cylindrical sleeve and clads the main body of the inductor, and the two leads protrude out of the sleeve from two opposite ends.

5. The motor of claim 4, wherein the shielding layer comprises a ground end electrically connected to the housing.

6. The motor of claim 5, wherein the end cap assembly further comprises an intermediate piece connected to the housing, and the ground end is electrically connected to the housing via the intermediate piece.

7. The motor of claim 4, wherein a first of the leads is connected to one of the brushes and the second lead is connected to the connecting piece.

8. The motor of claim 7, wherein the end cap assembly comprises a plurality of connecting pieces for connecting an external power source; a slot is formed in the connecting piece and the second lead of the inductor is pressed into the slot.

9. The motor of claim 1, wherein the stator further comprises a plurality of magnets housed in the housing.

10. The motor of claim 9, wherein the rotor further comprises a rotor core surrounded by the magnets and a plurality of coils wound around the rotor core.

11. A window lift motor assembly, comprising:
a casing;
a worm gear rotatably housed in the casing; and
a motor connected to the casing,
the motor comprising:
a stator having a metal housing;
a rotor rotatably received in the housing, and having a worm shaft engaging the worm gear and a commutator fixed to the worm shaft;
a plurality of brushes making sliding contact with the commutator;
an inductor connected to one of the brushes;
an end cap assembly integrally formed with the casing and connected to the housing and comprising an insulate end cap; and
a shielding layer attached on an inner wall of the insulate end cap, to clad the inductor and electrically connected to the housing, and wherein the shielding layer transfers EMI signals radiated by the inductor to the housing.

12. The assembly of claim 11, wherein the shielding layer is made of metal and does not protrude out of the insulate end cap.

13. The assembly of claim 11, wherein the shielding layer is a thin tin sheet.

14. The assembly of claim 11, wherein the inductor comprises a substantially cylindrical main body with two leads extending from respective axial ends of the main body, and the shielding layer is substantially hollow cylindrical sleeve and clads the main body of the inductor, and the two leads protrude out of the sleeve from two opposite ends.

15. The assembly of claim 14, wherein the shielding layer comprises a ground end electrically connected to the housing.

16. The assembly of claim 15, wherein the end cap assembly further comprises an intermediate piece connected to the housing, and the ground end is electrically connected to the housing via the intermediate piece.

17. The assembly of claim 14, further comprising a connecting piece for connecting to an external power source, wherein a first of the leads is connected to one of the brushes and the second lead is connected to the connecting piece.

18. The assembly of claim 17, wherein a slot is formed in the connecting piece and the second lead of the inductor is pressed into the slot.

19. The assembly of claim 11, wherein the stator further comprises a plurality of magnets housed in the housing.

20. The assembly of claim 19, wherein the rotor further comprises a rotor core surrounded by the magnets and a plurality of coils wound around the rotor core.

\* \* \* \* \*